United States Patent [19]

Aoki et al.

[11] Patent Number: 5,444,809
[45] Date of Patent: Aug. 22, 1995

[54] FLAME RETARDANT RESIN COMPOSITION AND FLAME RETARDANT PLASTIC OPTICAL FIBER CABLE USING THE SAME

[75] Inventors: Kazunori Aoki, Sagamihara; Yasufumi Yamamoto; Koji Ueki, both of Ichihara, all of Japan

[73] Assignees: Mitsubhishi Rayon Company Ltd.; Du Pont-Mitsui Polychemicals Co., Ltd., both of Tokyo, Japan

[21] Appl. No.: 300,556

[22] Filed: Sep. 6, 1994

[30] Foreign Application Priority Data

Sep. 7, 1993 [JP] Japan .................................. 5-222602
Sep. 7, 1993 [JP] Japan .................................. 5-246165

[51] Int. Cl.⁶ ........................... C09K 21/12; G02B 6/44
[52] U.S. Cl. .......................... 385/128; 252/609; 428/392; 428/921; 524/414; 525/169; 525/209
[58] Field of Search ............... 385/100, 114, 123, 128, 385/141, 145; 252/601, 609; 428/375, 392, 394, 920, 921; 524/80, 414; 525/72, 86, 169, 209

[56] References Cited

FOREIGN PATENT DOCUMENTS 2-257105  10/1990  Japan .

Primary Examiner—John D. Lee
Attorney, Agent, or Firm—Oblon, Spivak, McClelland, Maier, & Neustadt

[57] ABSTRACT

A flame retardant resin composition comprising a mixture of:
a) 10 to 70 parts by weight of an ethylene/(meth)acrylic ester copolymer;
b) 30 to 90 parts by weight of a low crystalline ethylene/higher olefin copolymer;
c) 0 to 30 parts by weight of an ethylene polymer selected from the group consisting of polyethylene and crystalline ethylene/α-olefin copolymers;
d) 150 to 250 parts by weight, based on 100 parts by weight of the polymer components a), b) and c), of a metal hydroxide flame retardant; and
e) 2 to 30 parts by weight of red phosphorus, and a flame retardant plastic optical fiber cable comprising a plastic optical fiber core and the above resin composition covering the plastic optical fiber core.

11 Claims, 1 Drawing Sheet

FLAME RETARDANT RESIN COMPOSITION AND FLAME RETARDANT PLASTIC OPTICAL FIBER CABLE USING THE SAME

BACKGROUND OF THE INVENTION

1. Field of the Invention

The present invention relates to a resin composition, which has a good processability and can provide a molded product having high flame-retardancy and excellent mechanical properties, and a flame retardant plastic optical fiber cable having a covering layer of such a flame retardant resin composition.

2. Description of the Related Art

A resin composition containing a halogen-containing flame retardant is known as a flame retardant resin composition. It is pointed out that during combustion this resin composition evolves a halogen-containing gas which is harmful to the human body.

In order to solve the above problem, a halogen-free flame retardant resin composition comprising an ethylene polymer and incorporated therein a metal hydroxide has been proposed, and this flame retardant resin composition has been used as a flame retardant covering material for electric wires and cables. However, the use of the halogen-free flame retardant covering material as a flame retardant covering material for plastic optical fiber cores gives rise to several problems. Specifically, the molding temperature of the flame retardant covering material is adjusted to the temperature at which the electric wire cable is formed. When a flame retardant plastic optical fibercable is molded under this condition using the above covering material, the plastic optical fiber core undergoes thermal damage, which results in a significant increase in light transmission loss in the optical fiber cable, so that the optical fiber cable cannot be put to practical use. Further, the flame retardant covering material has an excessive adhesion to the electric wire cable. This gives rise to the following problem when the covering material is applied to a plastic optical fiber cable. Specifically, in a plastic optical fiber cable prepared by using this covering material, when the ends of the plastic optical fiber cable are treated, the ends of the covering material (cabling material) should be peeled off from the core. In this case, it is very difficult to successfully peel the end portions from the core.

Regarding the flame retardant covering material for the formation of a flame retardant plastic optical fiber cable, Japanese Unexamined Patent Publication (Kokai) No. 2-257105 discloses an invention directed to a composition comprising an ethylene polymer, magnesium hydroxide and red phosphorus. Plastic optical fiber cables having excellent flame retardancy among the plastic optical cables using a composition according to the above invention have at least one of the problems: i) the adhesion between the flame retardant covering layer and the core is so high that it is difficult to peel off the covering material at the end of the optical fiber cable; ii) the ductility of the flame retardant covering layer of the cable is so low that the bendability is poor; and iii) the adhesion between the flame retardant covering layer and the plastic optical fiber core is so low that the interface of the covering layer and the core is likely to peel, that is, the handleability is unsatisfactory. Plastic optical fiber cables free from the above drawbacks and having a high flame retardancy have not been developed in the art.

Optical fibers are utilized in light transmission, illumination, decoration, design, display and other fields. Inorganic glass optical fibers having light transmitting properties good enough to transmit light in a wide range of wavelengths are known in the art. The inorganic glass optical fibers, however, have a problem in that they are likely to break, so that the bendability is poor. On the other hand, plastic optical fibers have excellent bendability and have become useful in various optical communication fields including short-distance LANs.

The plastic optical fiber cable comprises a single thin optical fiber or a bundle of a plurality of thin optical fibers and a protective covering material covering the periphery of the optical fiber(s). This plastic optical fiber cable has been utilized in the field of optical communication and communication within vehicles, such as automobiles, and as light guides for various types of equipment. When the optical fiber cables are used in a high-temperature atmosphere, they should have a high flame retardancy.

In the conventional flame retardant plastic optical fiber cable, a plasticized vinyl chloride resin is used as the covering material. The optical fiber cable using the plasticized vinyl chloride has problems of evolution of a halogen-containing gas during combustion and a deterioration in light transmitting properties due to damage to the plastic optical fiber core by the plasticizer. On the other hand, as described above, the plastic optical fiber cable using as the flame retardant the resin composition comprising magnesium hydroxide, red phosphorus and ethylene polymer as proposed in the above-mentioned Japanese Unexamined Patent Publication (Kokai) No. 2-257105 does not have well-balanced properties.

SUMMARY OF THE INVENTION

Under the above circumstance, the present inventors have made studies with a view to developing a flame retardant resin composition which can impart excellent flame retardancy and mechanical properties to plastic optical fibers, particularly plastic optical fibers using polymethyl methacrylate as a core, can be extrusion-coated on plastic optical fibers at a relatively low temperature and can provide an optical fiber cable in which the adhesion between the covering layer and the optical fiber core is suitable for treating the end face of the plastic optical fiber cable, and a plastic optical fiber cable using this flame retardant resin composition. This has led to the completion of the present invention.

Specifically, according to an aspect of the present invention, there is provided a flame retardant resin composition comprising a mixture of:

a) 10 to 70 parts by weight of an ethylene/(meth)acrylic ester copolymer;

b) 30 to 90 parts by weight of a low crystalline ethylene/higher olefin copolymer;

c) 0 to 30 parts by weight of an ethylene polymer selected from the group consisting of polyethylene and crystalline ethylene/α-olefin copolymers;

d) 150 to 250 parts by weight, based on 100 parts by weight of the polymer components a), b) and c), of a metal hydroxide flame retardant; and e) 2 to 30 parts by weight of red phosphorus. According to another aspect of the present invention, there is provided a flame retardant plastic optical fiber cable comprising a plastic optical fiber core and the above resin composition covering the periphery of the plastic optical fiber core.

DESCRIPTION OF THE PREFERRED EMBODIMENTS

Figure 1:
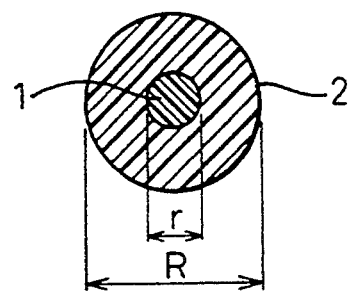
FIG. 1 is a cross-sectional view of an embodiment of the flame retardant optical fiber cable according to the present invention.

The ethylene/(meth)acrylic ester copolymer as the component a) in the present invention preferably has a (meth)acrylic ester comonomer content in the range of from 1 to 12% by mole, preferably in the range of from 3 to 10% by mole and a melt flow rate of not more than 2 g/10 min, preferably at least 0.1 g/10 min, more preferably in the range of from 0.1 to 1 g/10 min, as measured at a temperature of 190° C under a load of 2160 g (the same shall apply hereinafter). The copolymer as the component a) should have a high strength and, at the same time, a good elongation, even where it contains a metal hydroxide flame retardant and red phosphorus inorcorporated in a high amount. The adhesion between the covering layer and the plastic optical fiber core should be suitable for the preparation of a flame retardant optical fiber cable by covering an optical fiber core with the resin composition of the present invention. In the preparation of such an optical fiber cable, the (meth-)acrylic ester comonomer content of the copolymer as the component a) is preferably in the range of from 1 to 12% by mole, particularly preferably in the range of from 3 to 10% by mole. The term "(meth)acrylic ester refers to an acrylic ester or methacrylic ester, preferably an alkylester having 1 to 4 carbon atoms in the alkyl moiety. Specific examples of the (meth)acrylic ester usable in the preparation of the copolymer as the component a) include methyl (meth)acrylate, ethyl (meth) acrylate, n-butyl (meth) acrylate and isobutyl (meth) acrylate.

The ethylene/higher olefin copolymer as the component b) is a low crystalline copolymer obtained by conducting copolymerization in such a manner that the ethylene comonomer content is in the range of from 82 to 93% by mole. Further, it has a melt flow rate in the range of from 0.5 to 20 g/10 min, preferably in the range of from 1 to 10 g/10 min. The higher olefin used in the preparation of this copolymer is preferably an α-olefin having 4 or more carbon atoms, particularly preferably an α-olefin having about 4 to 10 carbon atoms. A copolymer prepared using 1-butene is particularly preferred as the component b) because it has well-balanced properties. In the copolymer as the component b), the term "low crystalline" is intended to mean that the crystallinity of the polymer as determined by X-ray diffractometry is in the range of from 3 to 20%, preferably in the range of from about 5 to 15%. The copolymer as the component b) is a component which imparts an excellent strength to a molded product prepared using the resin composition of the present invention. In this case, it is noted that a molded product having an excellent strength cannot be prepared using a resin composition comprising the same ingredients as the resin composition of the present invention except that a low crystalline ethylene/propylene copolymer is used as the copolymer of the component b). Further, a resin composition comprising the same ingredients as the resin composition of the present invention except that a high crystalline ethylene/higher clefin copolymer is used as the copolymer of the component b) lacks in filler loadability, and has a low mechanical strength and a poor extrudability, so that a molded product of the resin composition unfavorably has a rough surface.

The melt flow rate of the ethylene/higher olefin copolymer as the component b) is preferably in the range of from 0.5 to 20 g/10 min. When the melt flow rate of the copolymer as the component b) is excessively low, the moldability of the resin composition is unsatisfactory. On the other hand, when the melt flow rate of the copolymer as the component b) is excessively high, a molded product of the resin composition unfavorably has lowered mechanical properties particularly in respect of strength, elongation and other properties.

The copolymer as the component a) may be prepared by copolymerizing ethylene with a (meth)acrylic ester in the presence of a radical initiator under high temperature and high pressure conditions. The copolymer as the component b) may be prepared, for example, by copolymerizing ethylene with a higher clefin in the presence of a vanadium compound, such as vanadium oxychloride or vanadium tetrachloride, and an organoaluminum compound in an inert medium.

In the present invention, in order to improve the resistance to scuffing, an ethylene polymer c) selected from polyethylene and crystalline ethylene/α-olefin copolymer may be used in addition to the components a) and b) . It is preferable from the view point of filler loadability that the ethylene polymer c) has a density of 0.90 to 0.94 g/cm$^3$, especially 0.90 to 0.93 g/cm$^3$. Preferably, the α-olefin for the crystalline ethylene/α-olefin copolymer may have 3 to 18, especially 4 to 10 carbon atoms and include, for example, propylene, 1-butene, 1-hexene, 1-octene, 1-decene and 4-methyl-1-pentene Such a polymer and copolymer may be prepared by a high pressure process or moderate to low pressure process in a liquid or gaseous phase or in a bulk state in the presence of, for example, a transition metal-containing catalyst (so-called Ziegler process), an alumina- or silica-alumina-supported chromium oxide catalyst (so-called Phillips process), an alumina-supported molybdenum oxide catalyst (so-called standard process) and the like. Of these polymers, an ethylene/α-olefin copolymer is preferred from the view point of the resistance to scufing and strength of the composition. The polymers as the component c) may have various molecular weights, but they preferably have an MFR of 0.1 to 20 dg/min, especially 0.5 to 10 dg/min, from the view point of the balance of the processability, strength and the like. Most preferably, the component c) may comprise a copolymer of ethylene and an α-olefin having 5 to 10 carbon atoms and having physical properties of a tensile strength of at least 20 MPa and an elongation of at least 500%.

As the components a), b) and c), there may be employed those polymers partially modified by grafting maleic anhydride or a silane compound.

Examples of the metal hydroxide flame retardant as b the component d) usable in the present invention include magnesium hydroxide, basic magnesium carbonate, hydrotalcite and aluminum hydroxide. They may be subjected to a surface treatment with a fatty acid, a metal salt of a fatty acid, a silane coupling agent or a titanate coupling agent or a salt of a phosphoric ester, and in general, the use of such surface treated products is effective in improving the moldability of the composition and the mechanical properties of molded products and for other purposes.

In the present invention, red phosphorus as the component e) is used in combination with the inorganic hydroxide flame retardant as the component d). In this case, it is also possible to use the red phosphorus which may be coated with a resin as the component e) with a non-combustible compound, such as aluminum hydroxide, being previously incorporated therein.

In the present invention, the kinds and proportions of the ethylene/(meth)acrylic ester copolymer as the component a), the low crystalline/higher olefin copolymer as the component b) and the ethylene polymer as the component c) used are preferably selected so that, based on 100 parts by weight in total of the components a), b) and c), the amount of the component a) is in the range of from 10 to 70 parts by weight, preferably in the range of from 10 to 50 parts by weight, the amount of the component b) is in the range of from 30 to 90 parts by weight, preferably in the range of from 50 to 90 parts by weight, and the amount of the component c) is in the range of from 0 to 30 parts by weight, preferably in the range of from 5 to 25 parts by weight with the melt flow rate of the composition being in the range of from 0.5 to 5 g/10 min, preferably in the range of from 0.5 to 2 g/10 min.

When the proportion of the copolymer as the component a) exceeds the above range, a composition cannot be obtained which has a good processability while maintaining desirable physical properties and flame retardancy. When the amount of the copolymer as the component b) used exceeds the above range, covering of the periphery of a plastic optical fiber core with the resin composition provides only a plastic optical fiber cable having a poor adhesion between the optical fiber core and the covering layer. When the amount of the ethylene polymer as the component c) used exceeds the above range, it is difficult to obtain a resin composition excellent in all properties of processability, physical properties, surface smoothness and flame retardancy.

In the resin composition according to the present invention, the metal hydroxide as the component d) is incorporated in an amount of 150 to 250 parts by weight, still preferably 150 to 200 parts by weight, based on 100 parts by weight in total of the components a), b) and c). When the content of the metal hydroxide as the component d) is less than 100 parts by weight, it is impossible to provide a molded product having a good flame retardancy. On the other hand, when the content of the metal hydroxide as the component d) exceeds 300 parts by weight, the moldability of the resin composition is unsatisfactory.

The amount of the red phosphorus as the component e) added to the resin composition is in the range of from 2 to 30 parts by weight, preferably in the range of from 5 to 20 parts by weight, still preferably in the range of from 10 to 20 parts by weight, based on 100 parts by weight in total of the copolymer as the component a) and the copolymer as the component b). When the amount of red phosphorus added is excessively small, a molded product obtained from the resin composition has a lowered flame retardancy. On the other hand, when the amount of the red phosphorus added is excessively large, the moldability of the resin composition is unsatisfactory.

The resin composition of the present invention may further comprise other additives in an amount of not more than 30 parts by weight based on 100 parts by weight of the resin composition. Examples of the additives usable in the present invention include antioxidants, weather resistance improvers, photostabilizers, UV absorbers, pigments, carbon black, calcium oxide, titanium oxide, calcium carbonate, zinc oxide and silicone oil.

The flame retardant resin composition of the present invention may preferably have a melt flow rate of 0.5 to 5 g/10 min, especially 0.5 to 2 g/10 min. Where the melt flow rate of the resin composition is too low, it becomes difficult to process it at a low temperature, thereby resulting in the increase of the transmission loss of an optical fiber. On the other hand, the melt flow rate higher than the above range may result in the deterioration of the fame retardancy and physical properties.

The plastic optical fiber used in the present invention may be any of a step index multimode optical fiber and a gradient index multimode optical fiber. Polymers for constituting the core of the step index multimode optical fiber include polymethyl methacrylate, a methyl methacrylate polymer containing 60% or more of methyl methacrylate units, a polystyrene polymer and deuterated polymers thereof, polycarbonate, poly-4-methylpentene-1, a silicone polymer, a phenylmaleimide polymer and an alkylmaleimide polymer, particularly an isopropylmaleimide polymer. Examples of the comonomer used in the preparation of the methyl methacrylate polymer include acrylic esters, such as methyl acrylate, ethyl acrylate, propyl acrylate, butyl acrylate and 2-ethylhexyl acrylate, and methacrylic esters, such as cyclohexyl methacrylate, benzyl methacrylate, ethyl methacrylate, propyl methacrylate and butyl methacrylate. The polymethyl methacrylate resin is preferably one prepared, for example, by continuous bulk polymerization as described in Japanese Examined Patent Publication No. 53-42260 from the viewpoint of improving the propagation characteristics of the optical fiber. It is also possible to use as a core component a polymer comprising a monomer having particular cyclic structure units and methyl methacrylate units.

In the present invention, the clad (sheath) material preferably comprises a polymer having a smaller refractive index than the core material. When PMMA resin is used as the core material, examples of the sheath material include fluoropolymers, specifically vinylidene fluoride polymers (including copolymers described herein, for example, vinylidene fluoride/tetrafluoroethylene copolymer (for example, a copolymer having a vinylidene fluoride content of not less than 50% by weight, preferably 70 to 90% by weight), vinylidene fluoride/propylene hexafluoride copolymer, vinylidene fluoride/hexafluoroacetone copolymer, vinylidene fluoride/trifluoroethylene copolymer and ter- or higher polymer of vinylidene fluoride), perfluoroalkyl methacrylate polymer and methacrylic ester polymer.

In the present invention, the outer surface of the optical fiber may be directly covered with a protective layer. Various materials may be used as the material for the protective layer. Specifically, the above-described material for the core material and the sheath material may be used, or alternatively other inorganic and organic materials may be used.

The sheath material and the protective layer of the optical fiber according to the present invention may be formed by coating the surface of a core component comprising a quartz glass core or an organic polymer with a solution of each polymer for protection dissolved in a solvent, such as ethyl acetate, dimethylformamide or dimethylacetamide, by the coating or immersion method or alternatively by conducting multi-component spinning of a polymer for a core material and a polymer for a sheath material and, at the same time, extruding a protective layer using a three-layer multi-component spinning nozzle.

An embodiment of the structure of the flame retardant plastic optical fiber cable according to the present invention is shown in FIG. 1. The flame retardant plastic optical fiber cable according to this embodiment comprises a plastic optical fiber 1 and a flame retardant covering layer 2 covering the flame retardant covering layer 1.

In the present invention, with respect to the proportion of the flame retardant covering material layer, the ratio of the outer diameter (r) of the optical fiber to the outer diameter (R) of the covering material layer is in the range of from 1:1 to 1:6, preferably in the range of from 1:1.5 to 1:3.5. When the proportion of the flame retardant covering material is below the above range it is impossible to maintain the flame retardancy of the cable. On the other hand, if the proportion of the flame retardant covering material layer exceeds the above range, the outer diameter of the cable is so large that the optical fiber cable does not conform to connectors specified in the standards.

The structure of the flame retardant optical fiber cable according to the present invention is not limited to that of the above embodiment, and various other embodiments are possible. It is possible to use a tension member in combination with the flame retardant covering material layer. The tension member may be placed within the cable, for example, by covering the optical fiber with the flame retardant resin while interposing the tension member.

According to another embodiment of the present invention, the optical fiber cable may be a multiconductor electric wire/optical fiber composite cable comprising a combination of an optical fiber with a metallic multiconductor electric wire.

Figure 2:
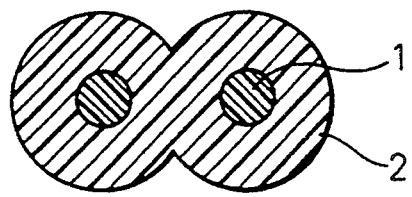
FIG. 2 is a cross-sectional view of another embodiment of the flame retardant optical fiber cable according to the present invention.
Figure 3:
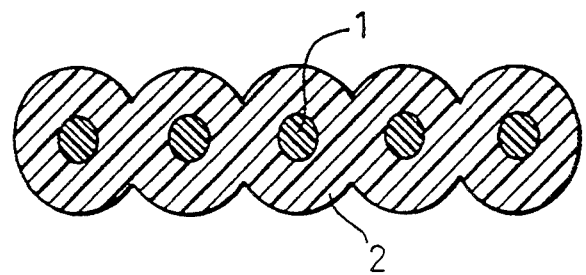
FIG. 3 is a cross-sectional view of a further embodiment of the flame retardant optical fiber cable according to the present invention.

Further embodiments of the flame retardant plastic optical fiber cable according to the present invention are shown in FIGS. 2 and 3.

The flame retardant plastic optical fiber cables according to these embodiments of the present invention are respectively a two-conductor plastic optical fiber cable comprising two plastic optical fibers 1 and a covering material layer 2 covering the plastic optical fibers 1 and a multi-conductor plastic optical fiber cable comprising five plastic optical fibers 1 and a covering material layer 2 covering the plastic optical fibers 1.

In a preferred embodiment of the flame retardant plastic optical fiber cable according to the present invention, the covering layer of the cable may have a multilayer structure. For example, it is possible to form a layer for improving the printability of the cable surface onto the flame retardant covering layer, to form the flame retardant covering layer with a plurality of layers having various properties, or to form a protective layer onto the flame retardant covering layer.

The flame retardant polymer composition according to the present invention has not only excellent flame retardancy, mechanical properties and moldability but also a suitable adhesion to a synthetic resin, particularly polymethyl methacrylate optical fiber. This renders the flame retardant polymer composition according to the present invention suitable as a covering material for synthetic resin optical fibers.

In the optical fiber cable according to the present invention, since the flame retardant covering material comprises flame retardant metal hydroxide and red phosphorus, even though the optical fiber core is flammable, the optical fiber cable is flame retardant as a whole.

The flame retardant covering material of the optical fiber cable does not contain any ingredient which migrates to the optical fiber with time and therefore has no adverse effect on the transmitting performance and mechanical properties of the optical fiber. Further, the covering material according to the present invention does not drip even when brought into contact with a flame and can also prevent the cable as a whole dripping.

Further, the particular covering material composition according to the present invention has a favorable extrudability and therefore can eliminate the necessity of an excessive extrusion temperature or extrusion pressure in the formation of the cable.

Furthermore, the plastic optical fiber cable of the present invention contains neither ingredients nor elements which produce a gas containing harmful substances during combustion, so that it is safe.

Evaluation of the flame retardant plastic optical fiber cable according to the present invention shows that the flame retardant plastic optical fiber cable can pass a vertical flame VW-1 test conforming to the UL-1581 standards specified by UL (Underwriters Laboratories).

EXAMPLES

The present invention will now be described in more detail with reference to the following examples, though it is not limited to these examples only.

Examples 1 to 11

An ethylene ethyl acrylate copolymer (EEA) as component a), a low crystalline ethylene, 1-butene copolymer (EBR) as component b), an ethylene/4-methyl-1-pentene copolymer (LLDPE) as component c), magnesium hydroxide and red phosphorus were mixed together according to the formulation specified in Table 1 and kneaded by means of a roll mill provided with 6-in. rolls to prepare flame retardant resin compositions.

The melt flow rate of the resin compositions was measured according to JIS K6760 (under conditions of a temperature of 190° C. and a load of 2160 g) and used as a measure of the moldability of the resin compositions.

Tensile property:

The resin composition was press-molded into a 1 mm-thick sheet from which a specimen conforming to specification No. 3 of JIS K6301 was prepared. The specimen was subjected to a measurement of tensile property according to JIS K6760.

Flame retardancy of resin molded product:

A test strand having an outer diameter of 2 mm was prepared from the resin composition using a melt indexer and evaluated according to a VW-1 type vertical flame combustion test as specified in UL (Underwriters Laboratories) standards 1581.

Pull-out strength for acrylic resin rod:

The resin composition was press-molded into a 2 mm-thick sheet. An acrylic resin rod comprising polymethyl methacrylate having an outer diameter of 2 mm was sandwiched between two sheets, and the laminate was press-molded into a 4 mm-thick sheet. The pull-out strength, which is the tensile force necessary to pull the acrylic resin rod out of the press sheet by 5 cm, was measured with a tensile tester.

Adhesion to optical fiber core:

The periphery of a synthetic resin optical fiber (Eska-extra EK-40 having an outer diameter of 1 mm; manufactured by Mitsubishi Rayon Co., Ltd.) was covered with the resin composition at a molding temperature of 160° C. so that the outer diameter became 2.2 mm. The resistance to peeling of the covering layer from the optical fiber core was observed and evaluated as follows.

Proper . . . Proper adhesion
Excess . . . Excessively strong adhesion which does not permit the covering to be peeled off
Insufficient . . . Insufficient adhesion ③ An ethylene/ethyl acrylate copolymer having an MFR of 5 g/10 min and an ethyl acrylate content of 8.5% by mole EBR: an ethylene/butene-1 copolymer having an MFR of 3.6 g/10 min, a density of 0.88 g/cm$^3$ and a crystallinity of 8%

LLDPE: an ethylene-4-methylpentene-1 copolymer having an MFR of 2.0 g/10 min and a density of 0.910 g/cm$^3$.

Magnesium hydroxide: Kisuma 5B manufactured by Kyowa Chemical Industry, Co., Ltd.

Red phosphorus flame retardant: Novaquel FST100 manufactured by Rin Kagaku Kogyo Co., Ltd. (a mixture of resin-coated red phosphorus with aluminum hydroxide; red phosphorus content 35-40% by weight)

Carbon black: Vulcan 9-A32 manufactured by Cabot Corporation

TABLE 1

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Ingredient (parts by weight) | | | | | | | | | | | |
| EEA ① | 50 | 30 | 50 | 50 | 30 | 20 | | | | | 20 |
| EEA ② | | | | | | | 20 | 50 | 50 | 30 | 50 |
| EEA ③ | | | | | | | | | | | |
| EBR | 50 | 40 | 40 | 40 | 70 | 40 | 50 | 50 | 70 | 50 | 75 |
| LLDPE | | 30 | 10 | 10 | | 20 | | | | | |
| Magnesium hydroxide | 150 | 175 | 175 | 150 | 175 | 175 | 175 | 150 | 200 | 200 | 180 |
| Red phosphorus flame | 40 | 30 | 30 | 40 | 30 | 30 | 30 | 40 | 20 | 20 | 45 |
| Carbon black | 5 | 5 | 5 | 5 | 5 | 5 | 5 | 5 | 5 | 10 | 5 |
| Properties | | | | | | | | | | | |
| Melt flow rate (g/10 min) | 0.80 | 1.00 | 0.72 | 0.77 | 1.36 | 0.79 | 0.51 | 0.71 | 1.17 | 0.51 | 1.00 |
| Tensile strength (MPa) | 7.0 | 6.8 | 6.2 | 6.8 | 7.6 | 6.4 | 6.8 | 7.6 | 5.0 | 4.8 | 6.5 |
| Elongation (%) | 565 | 535 | 510 | 545 | 600 | 565 | 640 | 665 | 555 | 560 | 580 |
| Flame retardancy (UL 1581) | Acceptable | Acceptable | Acceptable | Acceptable | Acceptable | Acceptable | Acceptable | Acceptable | Acceptable | Acceptable | Acceptable |
| Pull-out strength for acrylic resin rod (kg) | 22.7 | 24.8 | 27.9 | 22.5 | 23.3 | 23.1 | 24.6 | 26.3 | 28.5 | 29.5 | |
| Adhesion to core of optical fiber | | | Proper | Proper | Proper | | | | | | Proper |

The results are given in Table 1 at the bottom row.

Details of the ingredients of the composition specified in the table are as follows.

EEA:

① an ethylene/ethyl acrylate copolymer having an MFR of 0.5 g/10 min and an ethyl acrylate content of 47% by mole ② An ethylene/ethyl acrylate copolymer having an MFR of 0.5 g/10 min and an ethyl acrylate content of 8.5% by mole Comparative Examples 1 to 8

Ingredients were mixed together according to the formulation specified in Table 2 to prepare resin compositions. The properties of the resin compositions and the properties of the molded products of the resin compositions were measured in the same manner as in Example 1. The results are given in Table 2.

TABLE 2

| | Comparative Example No. | | | | | | | |
|---|---|---|---|---|---|---|---|---|
| | 1 | 2 | 3 | 4 | 5 | 6 | 7 | 8 |
| Ingredient (parts by weight) | | | | | | | | |
| EEA ① | | 100 | | | | | | |
| EEA ② | 50 | | 100 | 50 | | | | |
| EEA ③ | | | | | 100 | | | 50 |
| EBR | 50 | | | 50 | | 100 | 100 | 50 |
| LLDPE | | | | | | | | |
| Magnesium hydroxide | 125 | 175 | 200 | 250 | 200 | 200 | 200 | 200 |
| Red phosphorus flame retardant | 40 | 30 | 20 | 20 | 20 | 40 | 50 | 20 |
| Carbon black | 5 | 5 | 10 | 11 | 10 | 10 | 5 | 10 |
| Properties | | | | | | | | |
| Melt flow rate (g/10 min) | 0.74 | 0.15 | 0.15 | 0.03 | 0.66 | 1.86 | 1.88 | 0.56 |
| Tensile strength (MPa) | 6.4 | 4.6 | 6.1 | 6.7 | 4.6 | 6.8 | 7.9 | 5.6 |

TABLE 2-continued

| | Comparative Example No. | | | | | | | |
|---|---|---|---|---|---|---|---|---|
| | 1 | 2 | 3 | 4 | 5 | 6 | 7 | 8 |
| Elongation (%) | 600 | 160 | 630 | 21 | 47 | 600 | 670 | 34 |
| Flame retardancy (UL 1581) | Failure | Acceptable | Acceptable | Acceptable | Failure | Failure | Acceptable | Failure |
| Pull-out strength for acrylic resin rod (kg) | 22.4 | 32.0 | 35.0 | 29.5 | 38.5 | 13.0 | 10.4 | 23.4 |
| Adhesion to core of optical fiber | | | Excessive | | | | Insufficient | |

As is apparent from the results given in Tables 1 and 2, the resin compositions of Examples 1 to 11, which had been prepared by using an ethylene/(meth)acrylic ester copolymer having a melt flow rate of not more than 2 g/10 min in combination with a low crystalline ethylene/higher olefin copolymer and preparing formulations according to the present invention, were excellent in all of the moldability, tensile property and flame retardancy tests of the molded products of the resin compositions. Further, they had a good adhesion to a plastic optical fiber core. By contrast, the resin compositions of Comparative Examples 1 to 8, that is, a resin composition comprising an ethylene/(meth)acrylic ester copolymer having a melt flow rate of not more than 2 g/10 min alone, a resin composition comprising a low crystalline/higher olefin copolymer alone and resin compositions comprising ingredients according to an improper formulation, lacked in moldability, and the molded products thereof were unsatisfactory in at least one of the tensile property, flame retardancy and core adhesion tests.

Example 12

A flame retardant plastic optical fiber cable having a structure shown in FIG. 1 was prepared. This cable was prepared by providing a plastic optical fiber having an outer diameter of 1 mm and comprising a core material of polymethyl methacrylate and a sheath material of a fluorine-containing methacrylate of a fluorine-containing alcohol ester and covering the optical fiber with a flame retardant covering material of Example 11 specified in Table 1.

The retention of the light transmitting property of the resultant plastic optical fiber cable was evaluated by determining the light transmission losses before and after the plastic optical fiber cable was placed in an environment of 85° C. and 95%RH for 2,000 hr. As a result, the increase in the optical transmission loss was not more than 0.3 dB/15 m.

Further, in order to determine the flame retardancy of the optical fiber cable, the optical fiber cable was subjected to a vertical flame VW-1 test specified in UL standards 1581. As a result, it passed the test.

We claim:

1. A flame retardant resin composition comprising a mixture of:
   a) 10 to 70 parts by weight of an ethylene/(meth)acrylic ester copolymer;
   b) 30 to 90 parts by weight of a low crystalline ethylene/higher olefin copolymer;
   c) 0 to 30 parts by weight of an ethylene polymer selected from the group consisting of polyethylene and crystalline ethylene/α-olefin copolymers;
   d) 150 to 250 parts by weight, based on 100 parts by weight of the polymer components a), b) and c), of a metal hydroxide flame retardant; and
   e) 2 to 30 parts by weight of red phosphorus.

2. The flame retardant resin composition according to claim 1, wherein said ethylene/(meth)acrylic ester copolymer as the component a) has a (meth)acrylic ester comonomer content in the range of from 1 to 12% by mole and a melt flow rate (as measured at 190° C. under a load of 2160 g) of not more than 2 g/10 min.

3. The flame retardant resin composition according to claim 1, wherein said low crystalline ethylene/higher olefin copolymer as the component b) has an ethylene comonomer content in the range of from 82 to 93% by mole and a melt flow rate in the range of from 0.5 to 20 g/10 min.

4. The flame retardant resin composition according to claim 1, wherein said ethylene polymer c) is crystalline ethylene/α-olefin copolymer having a melt flow rate (as measured at 190° C. under a load of 2160 g) of 0.5 to 20 g/10 min.

5. The flame retardant resin composition according to claim 1, wherein said metal hydroxide flame retardant is magnesium hydroxide or aluminum hydroxide.

6. The flame retardant resin composition according to claim 1, which has a melt flow rate (as measured at 190° C. under a load of 2160 g) of 0.5 to 5 g/10 min.

7. A flame retardant plastic optical fiber cable comprising a plastic optical fiber core and, provided on the periphery thereof, a covering layer of a flame retardant resin composition according to claim 1.

8. The plastic optical fiber cable according to claim 7, wherein said flame retardant resin composition is a flame retardant resin composition according to claim 2.

9. The plastic optical fiber cable according to claim 7, wherein said flame retardant resin composition is a flame retardant resin composition according to claim 3.

10. The plastic optical fiber cable according to claim 7, wherein the ratio of the outer diameter of said plastic optical fiber cable core to that of the optical fiber cable is in the range of from 1:1.5 to 1:3.5.

11. The plastic optical fiber cable according to claim 7, wherein the plastic optical fiber core comprises a polymethyl methacrylate plastic.

* * * * *

UNITED STATES PATENT AND TRADEMARK OFFICE
CERTIFICATE OF CORRECTION

PATENT NO. : 5,444,809
DATED : August 22, 1995
INVENTOR(S) : Kazunori AOKI, et al.

It is certified that error appears in the above-indentified patent and that said Letters Patent is hereby corrected as shown below:

On the title page, Item [73], the first Assignee should read:

--Mitsubishi Rayon Company, Ltd.--

Signed and Sealed this

Fourteenth Day of November, 1995

Attest:

BRUCE LEHMAN

Attesting Officer

Commissioner of Patents and Trademarks